(12) United States Patent
Levy

(10) Patent No.: US 7,994,974 B2
(45) Date of Patent: Aug. 9, 2011

(54) DEVICE AND METHOD FOR THE REAL-TIME MONITORING OF THE INTEGRITY OF A SATELLITE NAVIGATION SYSTEM

(75) Inventor: Jean-Christophe Levy, Balma (FR)

(73) Assignee: Thales (FR)

(*) Notice: Subject to any disclaimer, the term of this patent is extended or adjusted under 35 U.S.C. 154(b) by 0 days.

(21) Appl. No.: 12/922,093

(22) PCT Filed: Mar. 10, 2009

(86) PCT No.: PCT/EP2009/052775
§ 371 (c)(1),
(2), (4) Date: Oct. 11, 2010

(87) PCT Pub. No.: WO2009/112483
PCT Pub. Date: Sep. 17, 2009

(65) Prior Publication Data
US 2011/0025558 A1 Feb. 3, 2011

(30) Foreign Application Priority Data
Mar. 11, 2008 (FR) ..................................... 08 01325

(51) Int. Cl.
*G01S 19/20* (2010.01)
(52) U.S. Cl. ................................................. 342/357.58
(58) Field of Classification Search .............. 342/357.58
See application file for complete search history.

(56) References Cited

U.S. PATENT DOCUMENTS

| | | | |
|---|---|---|---|
| 7,089,452 B2 | 8/2006 | Rubin et al. | |
| 7,894,983 B2 * | 2/2011 | Krach et al. | 701/208 |
| 2005/0015680 A1 | 1/2005 | Rubin et al. | |
| 2007/0208600 A1 * | 9/2007 | Babus et al. | 705/7 |
| 2009/0248387 A1 * | 10/2009 | Singhee et al. | 703/16 |

OTHER PUBLICATIONS

Rife et al., "Core Overbounding and its Implications for LAAS Integrity," ION GPX/GNSS, pp. 2810-2821 (Sep. 21, 2004).
Decleene, "Defining Psuedoorange Integrity—Overbounding," Proc of the Institute of Navigation (ION) GPS, pp. 1916-1924 (Sep. 19, 2000).
Kannemans, "An Integrity Availability and Continuity Test Method for EGNOS/WAAS," ION GNSS, 19th Intl Tech Meeting of Sat. Div. Of Inst of Navigation, pp. 882-893 (Jan. 1, 2006).

* cited by examiner

*Primary Examiner* — Thomas H Tarcza
*Assistant Examiner* — Frank Mcgue
(74) *Attorney, Agent, or Firm* — Baker & Hostetler

(57) ABSTRACT

The invention relates to a calculation device providing means for estimating an indication of integrity of a satellite navigation system, including a means for estimating in real time, by measuring data calculated by the navigation system, an indication of integrity of the system with respect to very low-probability location errors, the device including a means for receiving data calculated by the location system, a means for estimating a model of distribution of location errors, a means for estimating parameters characterizing the distribution model, a calculation means applying the extreme values theory as a function of the parameters characterizing the distribution model enabling the modeling of the distribution of very low-probability location errors, a means for estimating in real time an indication of integrity for very low-probability location errors, and a means for transmitting in real time an indication of integrity.

7 Claims, 2 Drawing Sheets

DEVICE AND METHOD FOR THE REAL-TIME MONITORING OF THE INTEGRITY OF A SATELLITE NAVIGATION SYSTEM

CROSS-REFERENCE TO RELATED APPLICATIONS

This application is a National Stage of International patent application PCT/EP2009/052775, filed on Mar. 10, 2009, which claims priority to foreign French patent application No. FR 08 01325, filed on Mar. 11, 2008, the disclosures of which are incorporated by reference in their entirety.

FIELD OF THE INVENTION

The field of the invention relates to satellite navigation systems, and more specifically to that of techniques providing the user with measurements of confidence in the error correction information supplied by the satellite system.

BACKGROUND OF THE INVENTION

A "satellite navigation system" is understood to mean any system devoted to wide area navigation, such as for example existing GNSSs (Global Navigation Satellite Systems) called GPS, GLONASS or the future GALILEO system, and all their equivalents and derivative systems.

A person skilled in the art is well aware of the location principle of satellite navigation systems. For example, in the GPS system, the radiofrequency signal transmitted by a satellite is encoded, and the time taken by this signal to reach the receiver to be located is used to determine the distance between this satellite and this receiver, this distance being preferably called the pseudorange.

To improve existing satellite systems in terms of accuracy, integrity, continuity and availability, augmentation systems have been provided. Integrity performance is particularly important since it plays a part in applications on which the safety of users depends. The European satellite augmentation system EGNOS improves the performance of two satellite systems, GPS and GLONASS. It transmits integrity messages to the user, which allow the user to thus assess the confidence they can have in the coordinates of their position and in the end act accordingly. EGNOS transmits pseudorange corrections and their accuracy in the form of a standard deviation and corrects:
- errors related to the passage of electromagnetic waves in the ionosphere and troposphere;
- errors related to GPS and geostationary satellites (slow corrections: orbit errors and clock errors);
- errors that vary rapidly such as clock errors due to "Selective Availability SA" (fast corrections).

Mention may be made of data called SREW (Satellite Residual Error for the Worst user location) as calculated pseudorange error data. This data represents the orbit error and clock error of the satellite seen from the worst-case user in the service area. UDRE (User Differential Range Error) data is an upper-bound estimate of the SREW. Mention may also be made of ionospheric errors: GIVD (Grid Ionospheric Vertical Delay). The ionospheric layer has been divided up with the aid of a grid. For each point on the grid, an estimate of the associated ionospheric delay is transmitted. The user whose measurement has little chance of piercing a grid point exactly will interpolate the values supplied for each of the four grid points neighboring the pierce point of the user. Moreover, the user will not necessarily see the satellite vertically, but will most certainly make an oblique measurement.

Only the sources of errors related to the receiver (clock error, eccentricity, multiple paths) persist. The user then calculates the "augmented" position, i.e. a position that is improved by virtue of the pseudorange corrections. The accuracy of this position is assessed by comparing it with a reference position. The pseudorange corrections allow the user to calculate in real time the accuracy of their position by error propagation. In civil aviation for example, protection levels are deduced from the positional accuracy. These protection levels are strict confidence intervals. These protection levels must not exceed the alert level specified for the flight phase. The integrity, availability and continuity of a navigation system are assessed with the aid of the position error, protection levels and alert levels.

FIG. 1 describes an architecture of a satellite navigation system including a GNSS differential positioning system and SBASs (Satellite Based Augmentation Systems) and GBASs (Ground Based Augmentation Systems). The aircraft take receivers on board which are connected to the augmentation systems.

EGNOS is an SBAS type system including a ground infrastructure SBAS G and geostationary satellites SBAS S. The ground infrastructure comprises a plurality of receiving stations distributed over a wide geographical area, which receive data from GNSS satellites and determine the pseudoranges, and a central station 1 for control and processing, which determines, from the pseudoranges transmitted by the SBAS G receiving stations, corrections and integrity which are combined into one SBAS signal. The geostationary satellites relay this signal from the central station to the receivers on the aircraft.

The GBAS system includes ground beacons intended to respond to local requirements necessitating a much higher level of accuracy within a determined operating range. These beacons are for example located in airport areas. The GBAS system also includes receivers fitted on board aircraft. The GNSS system supplies the aircraft and ground beacons information to calculate pseudoranges. The ground beacon supplies pseudorange correction information and information on the integrity of the differential positioning for each GNSS satellite in sight. The GBAS beacons supply more accurate corrections than those of an SBAS central station. In addition, the GBAS beacons are under the authority of the air control service which can thus control the transmission of these beacons according to the positional accuracy and integrity required.

A number of solutions for detecting the non-integrity of satellite systems are known, but none is capable of providing an indication of the integrity of the system in real time for very low-probability events, i.e. of the order of around $10^{-7}$. By way of example, mention may be made of U.S. Pat. No. 7,089,452 B2 describing a technique for evaluating the integrity of the GPS satellite system based on an estimator using the technique of moments. The current techniques are capable only of determining whether or not the satellite systems meet the certification. They perform only an a posteriori check of the level of integrity of the system. The main disadvantage of this type of solution is that an operator can only deactivate the system once the critical threshold is exceeded. These techniques do not provide for checking for the change of state of integrity of a satellite navigation system and in the end anticipating a failing situation.

It is known that augmented satellite systems are capable of meeting the specifications required for very low-probability events. These verifications have been carried out through cumbersome and tedious processes during the development phases. Once placed in operation, it is no longer possible to carry out these checks. According to the current techniques, they would require measurements to be carried out for which the test duration would be almost infinite. Specifically, to carry out integrity margin measurements, conventional inferential statistics attempts to model the behavior of a random variable on the observable domain of implementations. To obtain relevant statistics, it is necessary to retrieve sufficiently decorrelated data so as not to measure redundant information. It is estimated that sampling with a period of about five minutes between each measurement is required. Now, given the low probability of events that one seeks to detect, this would involve gathering billions of samples over thousands of years of measurements.

In addition, satellite systems have been certified at a level of integrity at $10^{-7}$ for the transmission of information over the whole of the satellite system and for a particular system. The current techniques do not provide for having a measurement of integrity at $10^{-7}$ over the whole of the life cycle of the satellite system and do not take into account specific disruptive elements at each location.

SUMMARY OF THE INVENTION

An aim of the invention is therefore to improve the techniques for monitoring navigation systems for very low-probability event integrity indications in order to better assess the integrity margin in view of strict specifications and notably for aeronautical applications.

More specifically, the invention is a calculation device providing the means for estimating an indication of integrity of a satellite navigation system, characterized in that wherein it includes the means for estimating in real time, by measuring data calculated by the navigation system, an indication of integrity of the system with respect to very low-probability location errors, these means including:
  a means for receiving data calculated by the location system,
  a means for estimating a model of distribution of location errors,
  a means for estimating parameters characterizing the distribution model,
  a calculation means applying the extreme values theory as a function of the parameters characterizing the distribution model enabling the modeling of the distribution of very low-probability location errors,
  a means for estimating in real time an indication of integrity for very low-probability location errors,
  a means for transmitting in real time an indication of integrity.

The invention is a solution to the problem of estimating the margin of integrity of a satellite navigation system for very low probability failure events. The invention proposes an approach that is different from solutions based on inferential statistical methods since with this method it is impossible to supply an indication in real time on low-probability events. A low-probability position error event is understood to mean one for which the probability of appearance must be less than $10^{-7}$ for a period of 150 seconds. Extreme events analysis is largely distinguished from conventional inferential statistics due to the very nature of the variables studied. This because it tries to predict behavior in the "tail of a distribution". The distribution of extreme values is known asymptotically and approximation by the asymptotic law turns out to be effective. From a distribution of items in the observable domain, the distribution of tail items, belonging to the domain of very low probability of appearance, can be modeled in real time and a margin of integrity can be quantified. The invention provides a means for assessing in real time the change in performance of a satellite navigation system. It is possible to thus predict a degradation in performance of the system and in the end anticipate cases of malfunctioning.

BRIEF DESCRIPTION OF THE DRAWINGS

The invention will be better understood and other advantages will become apparent on reading the following description given in a non-limiting way and with reference to the accompanying drawings in which.

DETAILED DESCRIPTION

Figure 1:
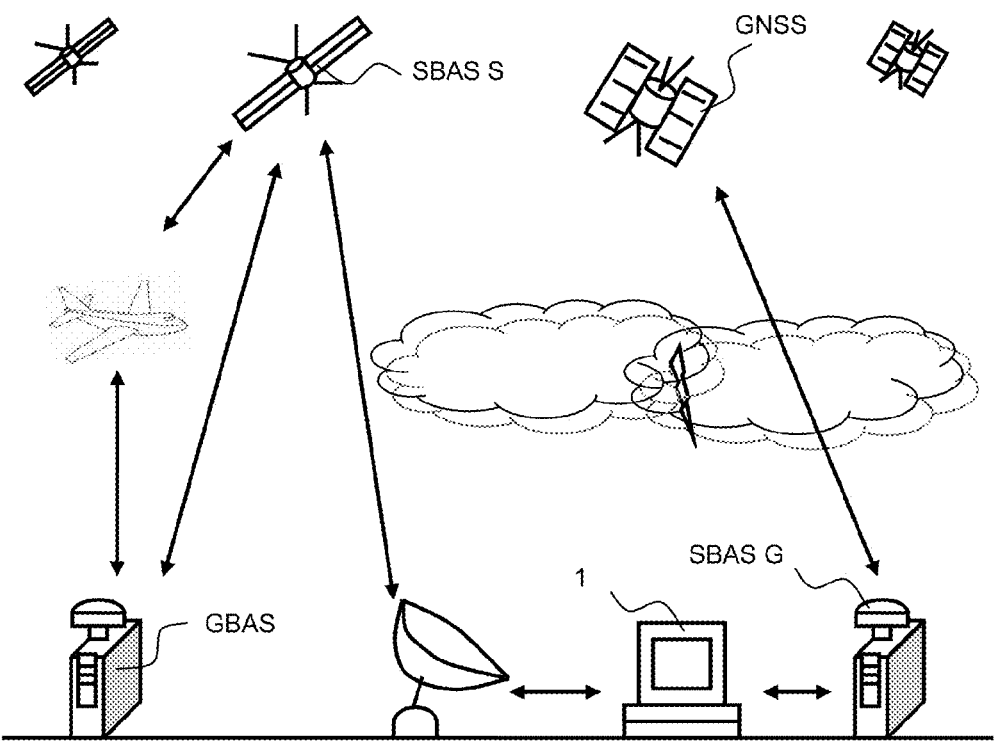
FIG. 1 represents an architecture of an augmented satellite navigation system. It includes two types of augmentation system providing indications of integrity of the satellite navigation system: an SBAS type space segment, for example EGNOS, and a GBAS type ground segment.

As illustrated in FIG. 1, the invention relates to calculation devices supplying indications on the integrity of the satellite navigation system. The invention is intended particularly for a GBAS type ground calculation station of an augmented satellite navigation system, which is found notably in airports, but can also be applied to control and processing stations of SBAS type augmentation systems.

A station for calculating the integrity of the navigation system includes a means for measuring the residual error of the position calculated by the navigation system. The input data for calculating an indication of integrity can come from:
  the domain of positions using position errors normalized by the range of protection levels;
  the domain of pseudoranges using error corrections calculated by the central control and processing station.

Figure 2:
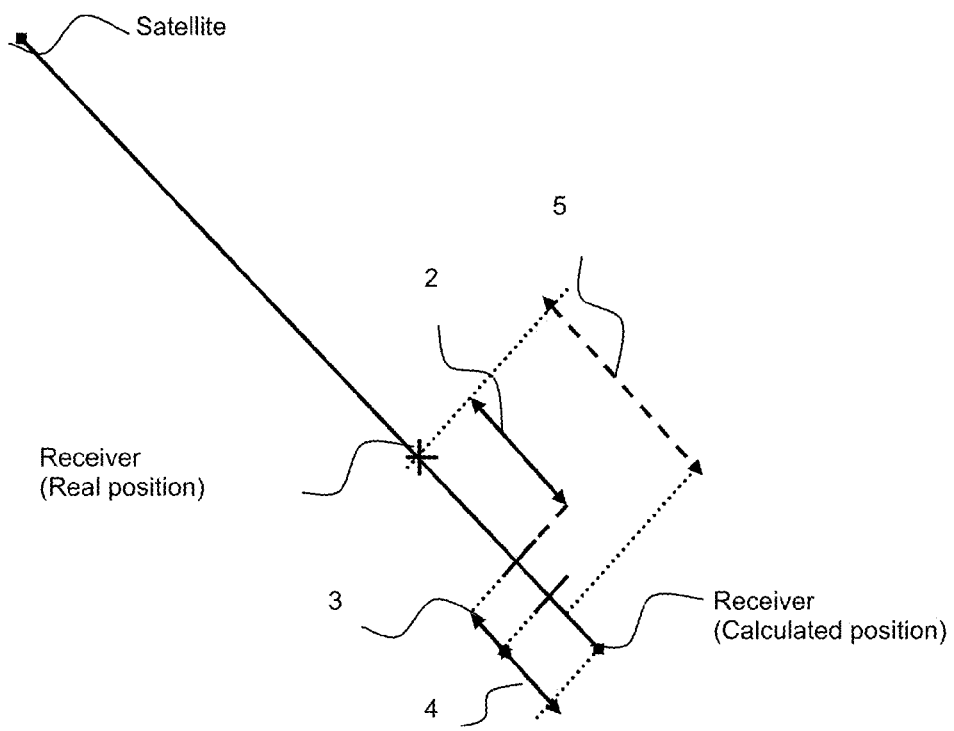
FIG. 2 represents the principle of determining the integrity information for the satellite navigation system using pseudorange data as input data.

FIG. 2 schematically represents the principle for determining the position error value. By way of non-limiting example, the integrity calculation station according to the invention includes differential positioning radiofrequency signal receivers of the satellite system, these receivers determining a calculated position of the station. The calculation station also includes a receiver to which the value of corrections 3 and 4 is supplied thus determining a corrected position value of the station. The calculation station also includes a storage means containing the value of the real position of the calculation station, a value evaluated by means of geodesic techniques. A computer thus calculates the difference between the real position and the calculated position of the station. This difference 2 is called the "residual" and enables the integrity of the navigation system to be determined. A threshold of integrity 5 is defined and the probability that this threshold of integrity 5 is less than the residual 2 must be less than $10^{-7}$.

Figure 3:
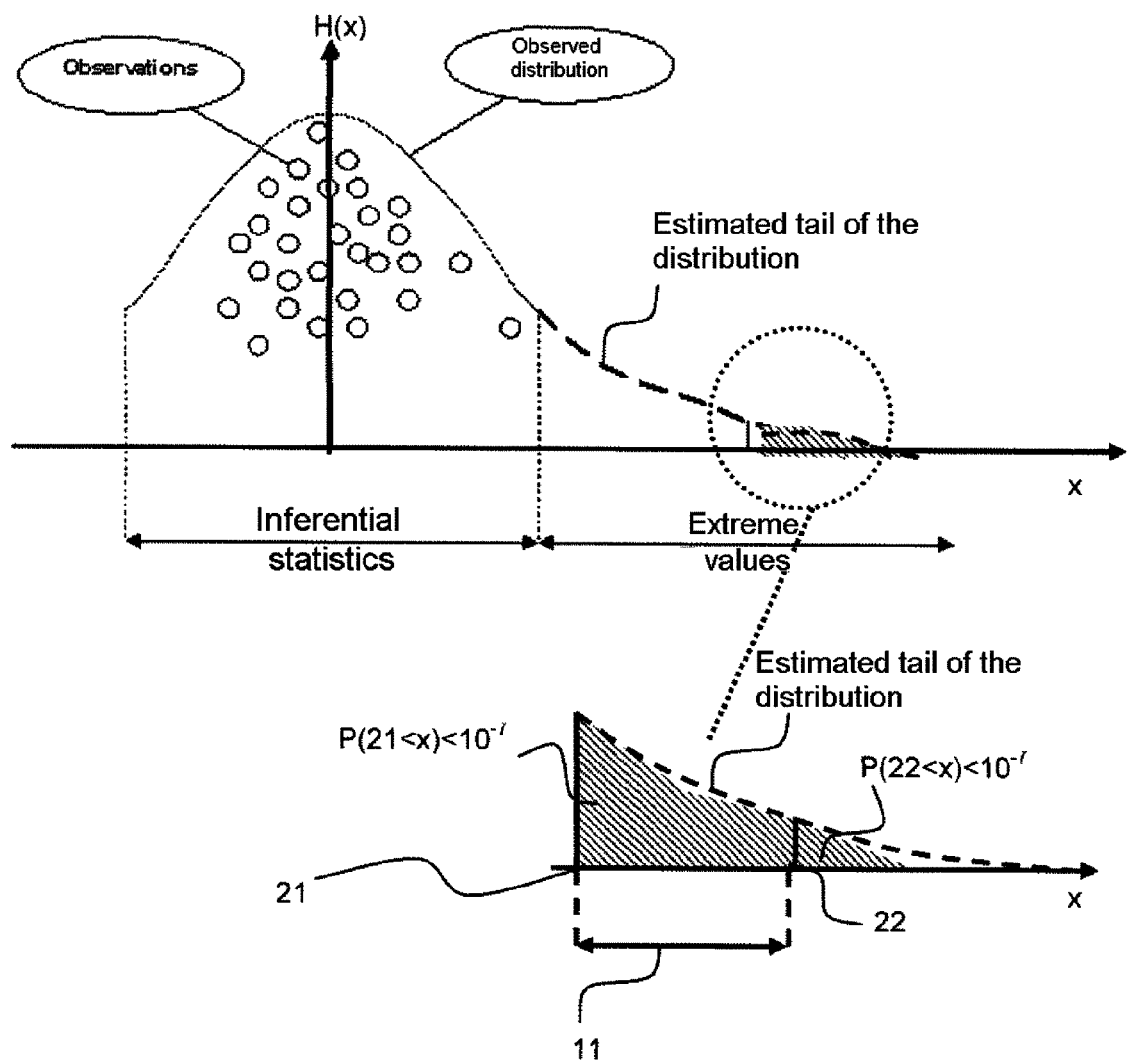
FIG. 3 represents a distribution of residual errors observed on the position calculations of a satellite navigation system. The tail of the distribution represents the very low-probability residual errors and is modeled by applying the extreme values theory on an estimated distribution model.

The calculation station according to the invention includes a calculation means for estimating a distribution of the residuals measured in real time. From this distribution, parameters are deduced which are then used by the calculation means to implement the extreme values theory. By way of non-limiting example, as illustrated in FIG. 3, the distribution model used is a Gaussian distribution. It is clear that the invention is not limited to using this estimator and in various adapted implementations, the invention can use other estimators. A person skilled in the art is aware of Pickands type estimators, the method of maximum likelihood or the method of moments. The parameters used later to implement the extreme values theory are dependent on the distribution model used.

The invention relates also to a method for estimating an indication of integrity of the navigation system, wherein it uses a device according to the invention to carry out the following steps in real time in order to estimate an indication of integrity of the system with respect to location errors x that must be of very low probability:

measurement of data x calculated by the location system, calculation of a model of distribution H of location calculation errors x of the system, determination of parameters (a, b, c) characterizing the distribution model H, a being the parameter defining the most probable value of the distribution, b being the parameter indicating the skewness of the extremes, and c being the parameter indicating the weight of the extremes in the distribution, modeling, in the probability, domain of the tail of the distribution H(x) by a calculation means as a function of the parameters (a, b, c) applied to the extreme values theory in the following way:

$$H_{a,b,c}(x) = \begin{cases} e^{-\left(1+a\frac{x-b}{c}\right)^{-\frac{1}{a}}} & \text{if } 1+a\frac{x-b}{c} > 0, a \neq 0 \\ e^{-e\left(-\frac{x-b}{c}\right)} & \text{if } a = 0 \end{cases}$$

comparison in real time of the distribution of location errors with a tolerance threshold 22 allowing an indication of integrity to be provided, transmission in real time of the indication of integrity 11 of the location system.

The reliability of the modeling of the tail of the distribution depends on the parameters a, b and c. These parameters come from the estimator determining a model of distribution of the input data, x representing the input data and corresponding to location error measurements. The parameter a is the location parameter; it is directly related to the most probable value of the law; it therefore indicates approximately where the core of the distribution is located. The parameter b is the dispersion parameter; it indicates the skewness of the extremes. The parameter c is called the dispersion index. The higher this index in absolute value, the more significant the weight of the extremes in the initial distribution. This parameter is an essential indicator on the behavior of the tail of the distribution, and when:

c>0: The domain corresponds to a Fréchet distribution, i.e. an unbounded distribution of x and a polynomial type decrease.

c=0: The domain corresponds to a Gumbel distribution, i.e. a distribution of x exhibiting an exponential type decrease in the tail of the distribution.

c<0: The domain corresponds to a Weibull distribution, i.e. a bounded distribution of x.

In a first implementation, position errors are measured with respect to a reference position in order to calculate a model of the distribution of location calculation errors of the system.

In a second implementation, pseudorange errors are measured with respect to a real distance in order to calculate a model of the distribution of location calculation errors of the system.

The input data for the calculation of the indication of integrity can come from any navigation system, and any associated augmentation system. By virtue of the invention, an indication of integrity can be provided in real time for events of very low probability based on data transmitted in real time and not on data from analyses of the system at a particular moment and under particular conditions. The integrity information for a probability at 10-7 is furthermore not based on determined data during the development of the system for a particular architecture. Advantageously, the invention supplies an indication of integrity independently of the satellite navigation system studied.

Advantageously, the reception means of the station for calculating the indication of integrity measures in real time the data calculated by the navigation system in such a way that the samples are sufficiently decorrelated in order to measure distinct information items. Specifically, it is necessary that the data sampling frequency is sufficiently spread out in order that the sample population is representative. Conventional inferential statistical methods do not provide for measuring the very low-probability residuals that we are trying to detect, due to their very low probability of appearance.

Advantageously, the margin between the estimated residual error and the residual tolerable error is modeled in real time at a very low probability of appearance, i.e. around $10^{-7}$. As illustrated in FIG. 3, 21 represents on the axis of abscissas the residual error estimated at a probability of $10^{-7}$. 22 represents the integrity tolerance threshold. For aeronautical applications, it is necessary that the probability that "22 is less than x", i.e. "P(22<x)<$10^{-7}$", is less than $10^{-7}$. The hatched area represents "P(21<x)" and is less than $10^{-7}$ and therefore it is deduced that "P(22<x)<$10^{-7}$". The level of integrity of the system at $10^{-7}$ respects the tolerance threshold 22 and the difference 11 between 21 and 22 represents the integrity margin. The current techniques are not capable of supplying this indication of integrity in real time for very low-probability events. They become restricted to giving an a posteriori indication of a threshold being exceeded. The integrity margin indication according to the invention finds interest in aeronautical applications, notably to assess the confidence in the navigation system during approach phases where the error becomes critical. The invention is intended particularly for GBAS type ground stations installed in airport areas, but it is clear that it applies more generally to any satellite navigation system integrity calculation system.

In another implementation of an indication of integrity, the residual positioning calculation error 22 of the system is modeled in real time at a very low probability of appearance, i.e. about $10^{-7}$ and the value of the residual error is transmitted in real time. The indication of integrity can be presented in absolute-value form of a value of a residual for very low-probability events. As illustrated in FIG. 3, 21 represents the residual error at $10^{-7}$ and 22 the tolerance threshold. 21 is less than 22; the system therefore demonstrates a valid integrity.

The invention is intended particularly for a GBAS type ground calculation station of an augmented satellite navigation system implementing the method according to the invention.

The invention claimed is:

1. A method providing means for estimating an indication of integrity of a satellite navigation system, wherein the method includes carrying out the following steps in real time in order to estimate an indication of integrity of the system with respect to location errors of very low probability:

measurement of data calculated by the system;

calculation of a model of distribution of location calculation errors of the system;

determination of parameters (a, b, c) characterizing the distribution model, a being the parameter defining the most probable value of the distribution, b being the parameter indicating the skewness of the extremes, and c being the parameter indicating the weight of the extremes in the distribution;

modeling, in the probability domain, of the tail of the distribution by a calculation means as a function of the parameters (a, b, c) applied to the extreme values theory in the following way:

$$H_{a,b,c}(x) = \begin{cases} e^{-\left(1+a\frac{x-b}{c}\right)^{-\frac{1}{a}}} & \text{if } 1+a\frac{x-b}{c} > 0, a \neq 0 \\ e^{-e\left(-\frac{x-b}{c}\right)} & \text{if } a = 0; \end{cases}$$

comparison in real time of the distribution of location errors with a tolerance threshold for providing an indication of integrity; and transmission in real time of the indication of integrity of the system.

2. A method as claimed in claim 1, wherein position errors are measured with respect to a reference position in order to calculate a model of the distribution of location calculation errors of the system.

3. A method as claimed in claim 2, wherein data calculated by the navigation system is measured in real time in such a way that the samples are sufficiently decorrelated in order to measure distinct information items.

4. A method as claimed in claim 1, wherein pseudorange errors are measured with respect to a real distance in order to calculate a model of the distribution of location calculation errors of the system.

5. A method as claimed in claim 1, wherein the margin between the estimated residual error and the tolerable residual error is modeled in real time at a very low probability of appearance.

6. A method as claimed in claim 1, wherein the residual positioning calculation error of the system is modeled in real time at a very low probability of appearance.

7. A ground calculation station of a satellite navigation system, the ground calculation station implementing the method as claimed in claim 1.

* * * * *